Figure 1:
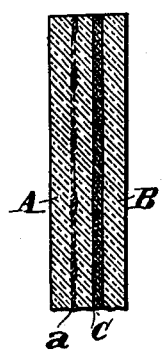

V. SHUMAN.
WIRE GLASS.
APPLICATION FILED MAR. 30, 1916.

1,355,625.

Patented Oct. 12, 1920.

Witness
E. W. Smith
J. Wesley Dale

Inventor
Victor Shuman
By
Attorney

UNITED STATES PATENT OFFICE.

VICTOR SHUMAN, OF PHILADELPHIA, PENNSYLVANIA, ASSIGNOR TO THE SUPER-GLASS COMPANY, A CORPORATION OF PENNSYLVANIA.

WIRE-GLASS.

1,355,625.  Specification of Letters Patent.  Patented Oct. 12, 1920.

Application filed March 30, 1916. Serial No. 87,701.

*To all whom it may concern:*

Be it known that I, VICTOR SHUMAN, a citizen of the United States, and resident of Philadelphia, county of Philadelphia, and State of Pennsylvania, have invented an Improvement in Wire-Glass, of which the following is a specification.

The object of my invention is to provide an improved construction of wire glass which, while having all of the advantageous qualities of wire glass heretofore in use, will embody a further feature of construction whereby the radiant heat, in case of fire, is to a very material extent prevented from passing through the glass, said result being secured by providing within the glass a sheet or layer of organic material which, by application of heat, assumes an effective condition of athermancy to the radiant heat.

In the general use of wire glass, it is desirable that it shall have transparency or at least be sufficiently translucent to light that the illumination of the interior of the building or room is not interfered with, and as most substances which are reasonably athermous are also more or less opaque to light, I prefer to employ an interposed layer between the glass sheets and preferably uniting them, which shall normally be transparent or reasonably translucent to light and capable of being transformed, when subjected to heat, into a condition having a pronounced athermancy or power of arresting the transmission of radiant heat in case of fire.

When wire glass is set in a fire-proof frame, it will hold back a fierce fire for many hours, because, although it may freely crack, the glass is held together by the wire mesh, and higher heat welds the cracked glass pieces together again. When the flames impinge against wire glass for a reasonably long time, the wire glass becomes red hot, and almost white hot, and as it is a transparent material, the radiant heat passes through it. Therefore, when wire glass serves as a fire wall, perishable goods within six feet of the wire glass become charred and spoiled by the radiant heat of the fire, which goes through the wire glass. Also, persons cannot pass with safety a reasonable area thus heated, mainly because of the radiant heat which gets through.

The special advantage of my invention is, therefore, to produce an article which will resist fire much longer than will ordinary wire glass, and in doing so stop, as far as possible, the passage of all kinds of heat but mainly radiant heat. Wire glass will melt down after prolonged exposure to heat and any construction which will retard such action is most desirable, since it permits the firemen to have more time in which to act effectively before the spread of the flames. This quality, as well as the capacity of reducing to a great extent the transmission of the radiant heat through the compound wire glass is secured by the construction to be herein described.

In constructing my improved wire glass, I unite a sheet of wire glass (preferably having one surface polished) to a sheet of plain glass (also preferably having one surface polished) by a sheet of celluloid, gelatin or any similar transparent or translucent material of organic composition which may be welded or attached to the glass by any of the processes at present well known, the celluloid or gelatin carbonizing under action of heat and thus presenting a more or less athermic layer to stop the passage of the radiant heat.

It will thus be seen that the invention consists in providing wire glass sheet with a reinforcement of additional glass sheet and an interposed organic medium which is normally transparent or translucent, but having capacity for being transformed by heat into an opaque body less transparent or translucent and greatly more athermous to radiant heat.

In the broadest form of my invention, the glass layers may be united by a substance which is adiathermic to a large extent in its normal state such as alum or any of its compounds, though I prefer to employ a more transparent substance capable of strongly binding the layers of glass and of changing its own form to one of an opaque condition presenting a strong barrier to the passage of radiant heat in the event of a fire.

My invention also comprehends details of construction which, together with the features above specified, will be better understood by reference to the drawings, in which:—

Figure 1 is a cross section of a sheet of wire glass embodying my invention; and Figs. 2, 3, 4 and 5 are similar sectional views of modified forms of my improved wire glass.

In the several figures, A and A' and A'' is the ordinary wire glass sheet, B and B' the reinforce glass sheets and C and C' the uniting layers of celluloid or equivalent. The ordinary wire glass is made by various methods, but the product comprises a sheet of glass having embedded within it a layer of meshed wire "$a$", but as this article is so well known, no further detailed description will be necessary. The surfaces of the wire glass may be polished or not, as desired, but in the most approved form of my present invention, I prefer that the surface be welded to the celluloid or its equivalent shall be polished. The reinforce glass layer B and B' may be of any suitable glass but preferably polished plate, or at least having one of its surfaces polished. The layer C is preferably a sheet of celluloid welded or cemented or pasted to the glass surfaces. This may be accomplished by welding it under high heat and pressure to the glass surfaces, or by covering its surfaces with a thin layer of any kind of suitable cement or paste and then pressing it between the glass surfaces. Instead of celluloid, a sheet of gelatin or other similar organic material may be used.

In Fig. 1, I have shown the glass composed of the wire glass A and reinforce glass sheet B united by the celluloid layer C. In this case it would be preferable that the side corresponding to sheet B should be presented to the direction in which the heat or fire would be expected, as in this way the adiathermous layer would protect the wire mesh of the wire glass from the excessive radiant heat, thereby enabling the structure as a whole to maintain its integrity for a longer period.

Figure 2:
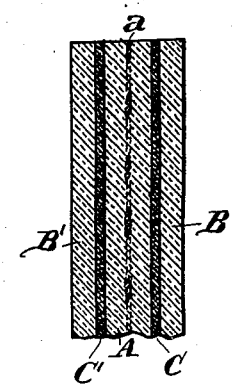

In the construction shown in Fig. 2, I have the same structure as in Fig. 1, with a second reinforce glass sheet B' upon the other side of the wire glass and a second celluloid welding layer C'. In this case the resistance to radiant heat would be the same from either side and hence it is immaterial which face is presented to the fire, and moreover, the total resistance to the passage of radiant heat would be twice as great in this construction as in that of Fig. 1.

Figure 3:
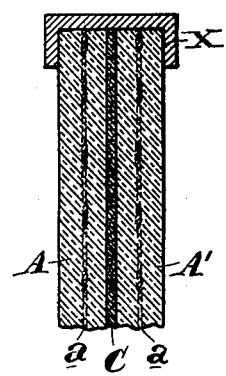

In the construction shown in Fig. 3, the reinforce sheet B of Fig. 1 has been replaced by a second wire glass sheet A', this of course being equivalent to the sheet B with the addition of the wire mesh $a$ and the covering of glass. It will be observed that, in this construction, the thickness of the second wire glass sheet is greater than the thickness of the glass sheet B of Fig. 1, and to that extent a more durable article is obtained and especially so, as it has an additional wire mesh reinforcement. The two wire glass sheets are united by the celluloid layer C as in the other examples, and while the construction of Fig. 3 has not as great athermancy or power of stopping radiant heat as that of Fig. 2, it has the advantage of greater mechanical strength.

Figure 4:
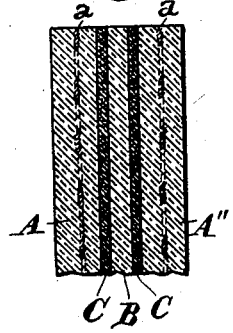
Figure 5:
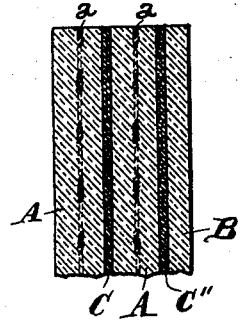

In Fig. 4, I have shown a sheet of plain glass B and celluloid layers C, C, upon its opposite surfaces, between the two wire glass sheets A and A'', while in Fig. 5, I have shown the sheets as in Fig. 3 with the addition of a sheet of plain glass B and an additional organic layer C''.

While I have, in describing my invention, made reference to the use of celluloid, by way of example, it is to be understood that gelatin or other transparent or translucent material may be made to adhere between the faces of the glass, either directly by heat and pressure or other means or by suitable cement or glue; and while I prefer to cause the interposed layer to directly weld to the glass surfaces, I do not restrict myself thereto.

Instead of welding a sheet of celluloid or other material, between the sheet of wire glass and the sheet of plate glass, or either of them, it may be coated with the sufficiently thick coating of celluloid solutions, or gelatin solutions, containing sugar, tartaric acid, mixed with small proportions of, for instance, nitrate of soda, to aid in the carbonizing. These layers may only be thick enough to produce the black curtain.

The essential feature of my invention is to produce a composite sheet of glass, having between two glass sheets any kind of material which will be transparent, or translucent, and which will turn dark or black or take on such form under the action of heat, as will make it adiathermous to keep the radiant heat from passing freely. For the mere purpose of producing a composite glass which will last longer against a fire than wire glass now does, it is not even necessary that the material C should turn black or carbonize, so long as it, when acted on by the initial heat of the fire, will swell up or become porous and thus produce a non-conducting adiathermic layer between the sheet of wire glass (if employed) and the sheet of plain glass. The change to produce the adiathermancy in the layer C would begin at or about 300° Fahr. and be complete about 600° Fahr., or below red heat.

If the sheet of plain glass is set toward the fire, the fire immediately cracks this thin sheet and heats the organic layer, which distils off all the volatile matter, and carbonizes the rest into a darker black coat, which coat serves as a good non-conductor to protect the sheet of wire glass itself from the heat for a considerable time, both because the porous-charred layer of organic matter is a splendid non-conductor of ordinary heat and also because most of the radiant heat is cut off by its dark color. If the non-conducting layers, for instance, were made of some of the silicate of soda composition or other similar compounds, then it would not turn dark, but would swell up into a non-conducting, porous layer, and thus reinforce the wire glass very considerably against ordinary heat as well as offering a barrier to radiant heat.

While the best and most practical results can be obtained by welding or cementing the organic layer between the sheets of glass, still certain benefits would be derived by, for instance, fastening the sheet of organic layer to only one of the sheets of the composition, or in case two sheets of wire glass be used with a sheet of organic material between them, then the three could be merely laid together (the organic layer in the middle) and then the whole closely set into a frame, as indicated at X in Fig. 3.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A fire resisting body, comprising a wire glass layer, combined with a second layer having a glass composition, and an interposed uniting layer of a material capable of arresting the passage of radiant heat when subjected to high temperature.

2. A fire resisting body, comprising a wire glass layer, combined with a second layer having a glass composition, and an interposed layer of a material which is normally transparent or translucent to light but under the action of high temperature becomes athermous to radiant heat.

3. A fire resisting body, comprising a wire glass layer, combined with a second layer having glass composition, and an interposed uniting layer of a material capable of retarding the passage of heat.

4. A fire resisting body, comprising a wire glass layer, combined with a second layer having a glass composition, and an interposed uniting layer of a material capable of retarding the passage of heat when subjected to high temperature.

5. A fire resisting body, comprising a wire glass layer, combined with a second layer having a glass composition, an interposed layer of a material which is normally transparent or translucent to light but under the action of high temperature becomes athermous to radiant heat, and which is directly and intimately attached to the opposing glass surfaces to unite the several layers into a unitary body.

6. A fire resisting body, comprising a wire glass layer, combined with a second layer having a glass composition, and an interposed layer of a pliable material firmly attached to the glass layers and which is normally transparent or translucent to light but under the action of high temperature becomes darkened so as to be substantially opaque to light and athermous to radiant heat.

7. A fire resisting body, comprising a plurality of sheets of glass composition united by a layer of material normally transparent or translucent, but which under the action of high temperature becomes porous, and will act as a non-conductor of heat.

8. A fire resisting body, comprising a plurality of sheets of glass composition, at least one of which is a sheet of wire glass, united by a layer of material normally transparent or translucent, but which under the action of high temperature becomes porous and will act as a non-conductor of heat.

9. A fire resisting body, comprising a plurality of sheets of glass composition, united by a layer of material normally transparent or translucent but which under the action of high temperature becomes opaque and athermous to radiant heat.

10. A fire resisting body, comprising a plurality of sheets of glass composition having one or more interposed layers of organic material which becomes athermous to radiant heat when exposed to high temperature, the whole united into a unitary structure.

11. A fire resisting body, comprising a sheet of wire glass, a sheet of plate glass, and an interposed layer of organic material between them.

12. A fire resisting body, comprising a sheet of wire glass, a sheet of plate glass, and an interposed layer of organic material between them said organic layer normally transparent or translucent to light but opaque and athermous when highly heated.

13. A fire resisting body, comprising a plurality of sheets of wire glass with an interposed organic layer which is athermous when heated.

14. A fire resisting body, comprising a plurality of sheets of wire glass and a sheet of plain glass, combined with interposed layers of organic substance between the opposing glass faces to provide a plurality of athermous layers when highly heated.

15. A fire resisting body, comprising a sheet of wire glass, a sheet of plate glass, and an interposed layer of organic material firmly welded or cemented between them.

In testimony of which invention, I hereunto set my hand.

VICTOR SHUMAN.

Witnesses:
ADELAIDE B. WATSON,
CHAS. H. DUNHER.